US011574530B2

(12) United States Patent
Gruber

(10) Patent No.: US 11,574,530 B2
(45) Date of Patent: Feb. 7, 2023

(54) ELECTRONIC SENSOR WITH FLEXIBLE SENSING DEVICE

(71) Applicant: Ecolink Intelligent Technology, Inc., Carlsbad, CA (US)

(72) Inventor: Brandon Gruber, San Marcos, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 296 days.

(21) Appl. No.: 16/892,417

(22) Filed: Jun. 4, 2020

(65) Prior Publication Data

US 2021/0383662 A1    Dec. 9, 2021

(51) Int. Cl.
| | | |
|---|---|---|
| *G08B 13/08* | (2006.01) | |
| *G01D 5/16* | (2006.01) | |
| *G08B 21/18* | (2006.01) | |
| *G01D 5/20* | (2006.01) | |
| *G01D 5/24* | (2006.01) | |

(52) U.S. Cl.
CPC .............. *G08B 13/08* (2013.01); *G01D 5/16* (2013.01); *G01D 5/20* (2013.01); *G01D 5/24* (2013.01); *G08B 21/182* (2013.01)

(58) Field of Classification Search
CPC ...... G08B 13/08; G08B 21/182; G01D 15/16; G01D 5/20; G01D 5/24
USPC ...................................................... 340/545.4
See application file for complete search history.

(56) References Cited

U.S. PATENT DOCUMENTS

| | | | | |
|---|---|---|---|---|
| 4,209,777 A | * | 6/1980 | Morrison ............... | G08B 13/08 340/539.1 |
| 5,343,759 A | * | 9/1994 | Hesthamar .............. | G01L 1/127 73/761 |
| 6,052,052 A | * | 4/2000 | Delmonaco ............ | G08B 25/08 340/307 |
| 6,657,429 B1 | | 12/2003 | Goldfine et al. | |
| 8,769,878 B1 | * | 7/2014 | Miller ..................... | E05F 15/74 49/506 |
| 8,997,588 B2 | | 4/2015 | Taylor | |
| 10,732,258 B1 | * | 8/2020 | Sundaram ............... | G10L 25/30 |
| 2003/0085631 A1 | | 5/2003 | Cech et al. | |
| 2005/0073419 A1 | * | 4/2005 | Gary .................. | G08B 21/0202 340/539.15 |

(Continued)

OTHER PUBLICATIONS

Flex Sensor Data Sheet, spectrasymbol.com, v.2014 Rev A, 2 pgs.
(Continued)

*Primary Examiner* — Kerri L McNally
*Assistant Examiner* — Thang D Tran
(74) *Attorney, Agent, or Firm* — Greenberg Traurig, LLP

(57) ABSTRACT

An electronic barrier alarm sensor having a flexible sensing device. The sensor may be mounted to a door, door frame, window, window frame, object or wall to detect when a door or window has been opened, that an object has been moved or to detect the presence of an animal. The flexible sensing device comprises one or more attributes that change as the flexible sensing device is bent, or unbent, by operation of a door, window, removal of an object, or the presence of an animal. Based on the changes, the electronic barrier alarm sensor may transmit an alarm signal when one or more measured values of the one or more attributes changes by more than one or more predetermined amounts.

10 Claims, 6 Drawing Sheets

(56) References Cited

U.S. PATENT DOCUMENTS

| | | | | |
|---|---|---|---|---|
| 2005/0280535 | A1* | 12/2005 | Gary | G08B 21/22 340/572.1 |
| 2008/0011093 | A1* | 1/2008 | Shank | G01R 27/2605 73/780 |
| 2008/0061969 | A1* | 3/2008 | Okude | G08B 13/122 340/541 |
| 2009/0056353 | A1* | 3/2009 | Sunderland | G01F 23/241 62/214 |
| 2009/0174561 | A1* | 7/2009 | Liu | H04B 10/272 340/578 |
| 2012/0011694 | A1* | 1/2012 | Morales, Jr. | E05B 17/06 29/428 |
| 2012/0048490 | A1* | 3/2012 | Feldstein | E06B 9/42 160/405 |
| 2013/0186000 | A1* | 7/2013 | Gilchrist | E06B 7/28 49/70 |
| 2014/0049276 | A1* | 2/2014 | De Boer | G01D 3/036 324/688 |
| 2014/0245798 | A1* | 9/2014 | Beckman | E05B 13/002 70/14 |
| 2015/0084769 | A1* | 3/2015 | Messier | H01Q 1/40 340/539.13 |
| 2016/0314684 | A1* | 10/2016 | McCuen | G08B 25/008 |
| 2016/0362928 | A1* | 12/2016 | Menze | E05B 1/0053 |
| 2017/0356238 | A1* | 12/2017 | Gitman | G01D 5/241 |
| 2018/0233005 | A1* | 8/2018 | Day | G08B 13/08 |
| 2018/0307393 | A1* | 10/2018 | Clark | G06F 3/0485 |
| 2019/0038170 | A1* | 2/2019 | Baxi | A61B 5/0205 |
| 2019/0051129 | A1* | 2/2019 | Hunt | G01R 33/02 |
| 2019/0188978 | A1 | 6/2019 | Lamb et al. | |
| 2019/0212858 | A1* | 7/2019 | Jeon | G06F 3/04815 |
| 2019/0236918 | A1* | 8/2019 | Toulemonde | G08B 13/08 |
| 2020/0018093 | A1* | 1/2020 | Szerszen | E05B 65/1066 |
| 2020/0090474 | A1* | 3/2020 | Fisher | G08B 7/066 |
| 2020/0170432 | A1* | 6/2020 | Parvarandeh | A47G 29/20 |
| 2020/0202697 | A1* | 6/2020 | Girle | G08B 29/188 |
| 2021/0209907 | A1* | 7/2021 | Carlson | G06K 7/10425 |

OTHER PUBLICATIONS

ISA/US, International Search Report and Written Opinion issued on PCT application No. PCT/US21/33992, dated Aug. 20, 2021, 15 pages.

\* cited by examiner

FIG. 7

700 - Monitor Flexible Sensing Device
702 - Door is Opened
704 - Determine Change in Value(s) of Attribute(s)
706 - Determine Door Open
708 - Perform Action
710 - Transmit Measured Value(s)
712 - Transmit Indication of How Far Door is Open
714 - Determine Door in Closed Position
716 - Transmit Indication of Door Closed

ELECTRONIC SENSOR WITH FLEXIBLE SENSING DEVICE

BACKGROUND

I. Field of Use

The present application relates to the field of sensing technologies. More specifically, the present application relates to a new type of electronic sensor.

II. Description of the Related Art

Electronic sensors are used in a variety of applications, such as home security and industrial applications. In home security applications, electronic sensors take the form of door and window sensors, motion sensors, garage door sensors, glass break sensors, etc. For decades, door and window sensors have comprised two distinct parts: a magnet and a reed switch/transmitter assembly. The reed switch/transmitter assembly is typically installed onto a stationary surface, such as a door or window frame, while the magnet is mounted to a movable portion of a door or window. When the door or window is closed, the magnet and reed switch are in close proximity to one another, maintaining the reed switch in a first state indicative of a "no alarm" condition. If the door or window is opened, proximity is lost between the magnet and the reed switch, resulting in the reed switch changing state, e.g., from closed to open or from open to closed. The change of state is indicative of a local alarm condition, and a signal may be generated by circuitry located within the reed switch assembly and sent, via wires or over-the-air, to a central security panel or gateway in the home, which may forward the signal to a remote monitoring station. In addition, a loud audible alert may be generated, either at the central security panel in the home or directly by the circuitry within the reed switch assembly, indicating that a door or window has been opened.

One problem with prior art door and window sensors is the overall "footprint" of door and window sensors. It is desirable to make the footprint as small as possible, because many people consider door and window sensors to be an eyesore, especially when each door and window in a home is outfitted with a sensor.

Another problem with having to use a magnet in a door or window sensor is cost. The cost of a magnet may approach one-fifth the overall cost of a sensor. Removing the magnet would, thus, save 20% or more to the cost of each sensor.

Another problem with prior art door and window sensors is that they can be difficult to install, because the magnet and the reed switch assembly must be closely aligned in order for these sensors to operate properly.

Yet another problem with prior art door and window sensors is that they cannot determine how far a door or window has been opened. They are generally only able to determine if a door or window is open or closed.

Prior art electronic sensors could also be used to detect when a thing of value has been moved. Again, a read switch assembly can be mounted to a movable thing of value with a corresponding magnet mounted to a stationary object, such as a floor or a wall. When someone moves the thing of value, magnetic contact is broken between the reed switch assembly and the magnet, and the reed switch assembly transmits a signal indicative of the movement. Such sensors also suffer from the same deficiencies noted above.

SUMMARY

The embodiments described herein relate to an electronic sensor and method of operating the electronic sensor. In one embodiment, an electronic sensor is described, comprising a flexible sensing device protruding externally from a housing of the electronic sensor for detecting when a barrier monitored by the electronic sensor has been opened, a transmitter for transmitting an alarm signal to a receiver, a memory having processor-executable instructions stored thereon, and a processor, coupled to the flexible sensing device, the transmitter, and the memory for executing the processor-executable instructions that cause the electronic sensor to monitor, by the processor, an attribute of the flexible sensing device, generate, by the processor, the alarm signal when the processor determines that a value of the attribute of the flexible sensing device has changed more than a predetermined threshold, and transmit, by the processor via the transmitter, the alarm signal.

In another embodiment, a method of operating a barrier alarm sensor is described, comprising monitoring, by a processor of the electronic sensor, an attribute of a flexible sensing device of the electronic sensor, the flexible sensing device protruding from a housing of the electronic sensor, generating, by the processor, an alarm signal when the processor determines that a value of the attribute of the flexible sensing device has changed more than a predetermined threshold, and transmitting, by the processor via a transmitter coupled to the processor, the alarm signal.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 7 is a functional block diagram of one embodiment of the electronic sensors as shown in FIGS. 1-6 in accordance with the teachings herein.

DETAILED DESCRIPTION

The present application relates to an electronic sensor for monitoring barriers, such as doors, windows, garage doors, gates, etc., as well as for use in providing notifications of activities, such as movement of an object, monitoring to determine the presence of an animal, or for other monitoring activities. The electronic sensor comprises a flexible sensing device that protrudes from a housing of the electronic sensor. When the flexible sensing device is bent, for example, as a door is opened, the electronic sensor determines a change of a value of an attribute of the flexible sensing device, and then performs one or more actions based on the value of the attribute. For example, the electronic sensor may transmit an alarm signal. The electronic sensor overcomes many problems of prior-art, magnet-based sensors, such as elimination of a magnet, resulting in a lower manufacturing cost, easier installation, and a reduction in the footprint of such sensors, thereby providing a sensor that is more aesthetically pleasing.

Figure 1:
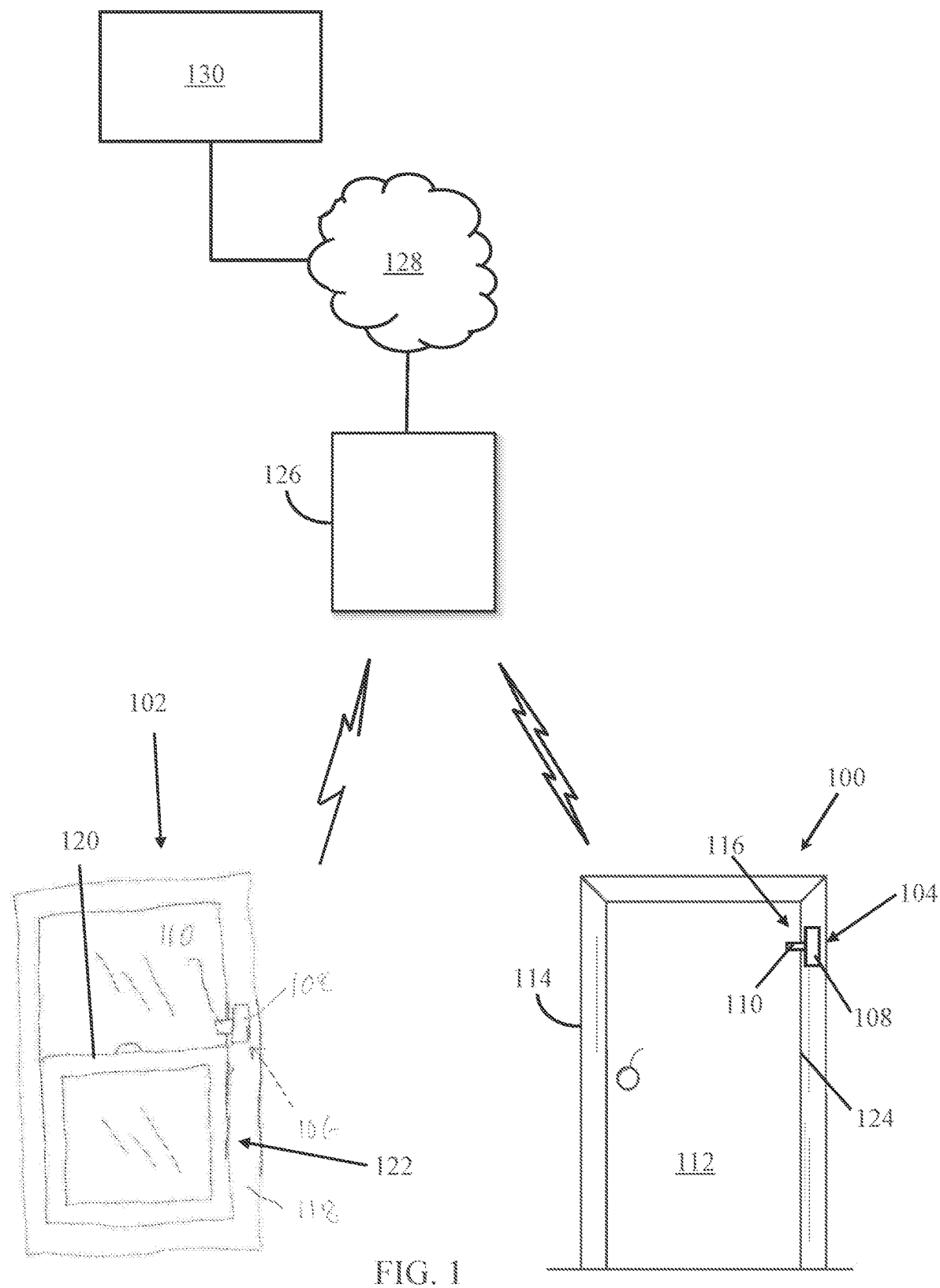
FIG. 1 is an illustration of a partial home security system in accordance with one embodiment of the principles discussed herein.

FIG. 1 is an illustration of a security system using one or more electronic sensors in accordance with the principles discussed herein. In this embodiment, a door assembly 100 and a window assembly 102 are monitored by electronic sensors 104 and 106, respectively. Each of the electronic sensors comprises a housing 108 and a flexible sensing device 110 protruding from each respectable housing.

In the example illustration of FIG. 1, electronic sensor 104 is mounted to a door jamb 114 such that flexible sensing device 110 extends across a space 124 between door jamb 114 and a door edge 116 proximate to the door jamb. In other embodiments, electronic sensor 104 may be mounted to door edge 116 such that flexible sensing device 110 extends across space 124 and over a portion of door jamb 114. When door 12 is opened, flexible sensing device 110 is bent as door 112 acts upon flexible sensing device 110, causing one or more attributes of flexible sensing device 108 to change. This/these change(s) are detected by processing circuitry within housing 108 and the processing circuitry performs one or more actions upon the one or more attributes exceeding one or more predetermined values.

Electronic sensor 106 operates in a similar manner as electronic sensor 104. In the example shown, housing 108 of electronic sensor 106 is mounted to a window frame 118, and flexible sensing device 110 protrudes from housing 108, extending across an area above upper frame member 120 of a lower sash 122 of window assembly 102. When lower sash 122 is raised, thus opening window assembly 102, upper frame member 120 bends flexible sensing device upwards, in this embodiment, causing one or more attributes of flexible sensing device 110 to change. This/these change(s) are detected by processing circuitry within housing 108 and the processing circuitry performs one or more actions upon the one or more attributes exceeding one or more predetermined values.

In another embodiment, a sensor the same or similar to electronic sensors 104 and 106 can be used to provide notifications of activities, such as movement of an object. For example, the sensor could be affixed to a valuable item, such as a television, portable computer, audio equipment, a valuable painting or artwork, etc. in order to determine when such an object has been moved. In this embodiment, the sensor is affixed such that flexible sensing device 110 is bent against a hard surface, such as a tabletop or a wall. If the object is moved, flexible sensing device 110 straightens as the object is moved away from the hard surface, causing one or more attributes of flexible sensing device 110 to change. This/these change(s) are detected by processing circuitry within housing 108 and the processing circuitry performs one or more actions upon the one or more attributes exceeding one or more predetermined values.

In yet another embodiment, a sensor the same or similar to electronic sensors 104 and 106 can be used to monitor for the presence of an animal. For example, the sensor could be affixed to a baseboard inside a home, or to an exterior wall of a home, near the ground, to detect the presence of rats or mice. These rodents tend to travel along walls, so placing a sensor along suspected travel routes may indicate their presence if a rodent passes the sensor and brushes against flexible sensing device 110. When a rodent passes the sensor, flexible sensing device 110 may be bent or deflected, causing one or more attributes of flexible sensing device 110 to change. This/these change(s) are detected by processing circuitry within housing 108 and the processing circuitry performs one or more actions upon the one or more attributes exceeding one or more predetermined values.

Referring back to FIG. 1, electronic sensors 104 and 106 each communicate with a receiver 126, such as a central security panel, a wireless router, a wireless hub, a mobile phone, computer, etc., typically by transmitting wireless RF signals generated by each electronic sensor. For example, if door 112 is opened, electronic sensor 104 may transmit an alarm signal in the form of a wireless transmission based on, for example, the popular Z-wave® protocol, to receiver 126. The alarm signal comprises one or more of an identification of the particular sensor reporting the alarm signal, a door or window status (i.e., "open", "closed"), a velocity or acceleration of a door or window (based on the rate of change of the position or velocity of the door or window, as determined by detecting the rate of change of the one or more attributes of flexible sensing device 110 by the internal processing circuitry), and/or an estimate of a position of the door or window (i.e., half-way open/closed, 3 inches open, wide open, etc.).

Figure 2:
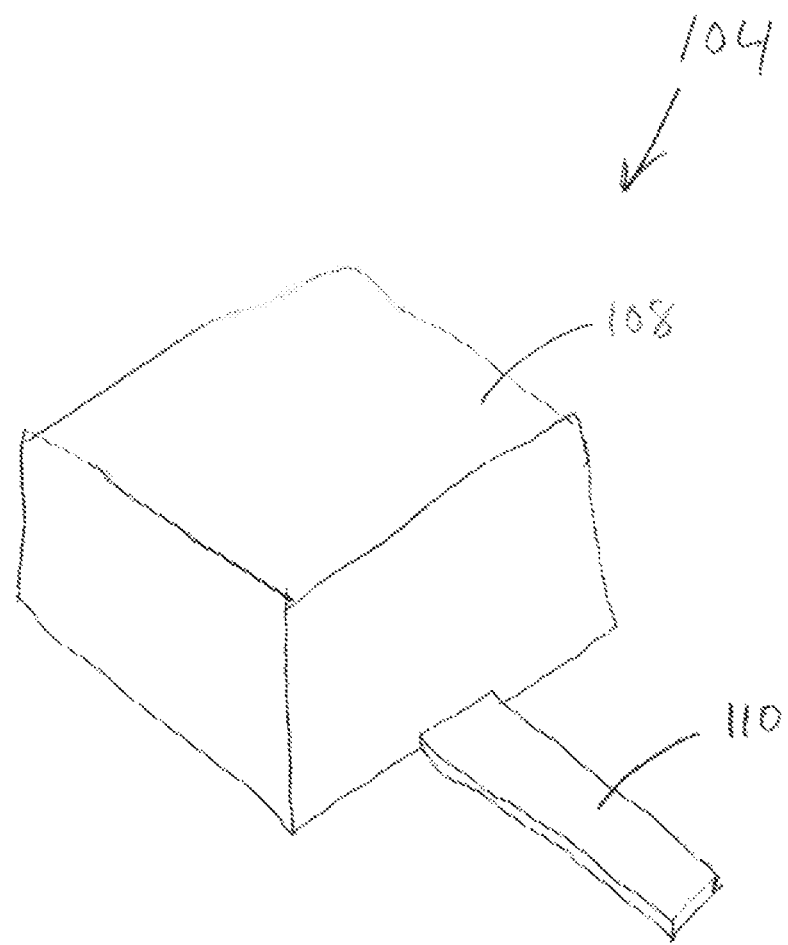
FIG. 2 is a close-up, isometric view of one of the electronic sensors shown in FIG. 1, configured for use on a door.

FIG. 2 is a close-up, isometric view of electronic sensor 104, configured for use on a door. Flexible sensing device 110 is shown protruding from housing 108 perpendicularly in a plane that is in alignment with a bottom surface (not shown) of housing 108. The length of flexible sensing device 110 is shown, in this example, to be approximately the length of housing 108, but in other embodiments, the length may vary depending on the application. The length of flexible sensing device, in one embodiment, is 2.2 inches, although in other embodiments, the length may be different. Also, in other embodiments, flexible sensing device 110 may extend from housing 108 at different locations other than the one shown in FIG. 2, and/or at one of any number of angles and not necessarily perpendicularly.

Figure 3:
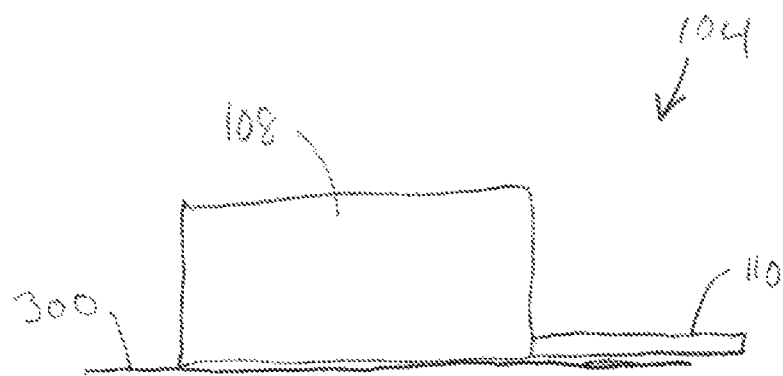
FIG. 3 is a side view of the electronic sensor as shown in FIG. 2, mounted to a surface such as a door frame, a door, or a surface, such as a table, desk, or wall.

FIG. 3 is a side view of electronic sensor 104 mounted to a surface 300, such as a door frame, a door, or a surface, such as a table, desk, or wall. Flexible sensing device 104 comprises an elastic material that applies a restoring force to flexible sensing device 104 when it is bent from its natural "quiescent" position. In the embodiment shown in FIG. 3, the quiescent position is shown as flexible sensing device 104 being in a "flat" or "straight position. In another embodiment, the quiescent position is a bent, or flexed position, such as the position shown in FIG. 4. In either case, flexible sensing device 104 may be bent, or straightened as the case may be as a door or window is opened or closed, an object is placed or removed in proximity to the sensor, or when an animal comes into contact with the sensor.

Flexible sensing device 104 comprises one or more attributes, such as a resistance, a capacitance or an inductance, as measured across two electronic terminals of flexible sensing device 104 (not shown), such as a pair of solder tabs. For example, flexible sensing device 110 may comprise a Flex Sensor FS, manufactured by Spectra Symbol Corp. of Salt Lake City, Utah. This particular sensor comprises a "flat resistance" of 10 k ohms, i.e., the resistance between the two electronic terminals is 10 k ohms when the sensor is unflexed. The resistance of this particular sensor increases to at least 20 k ohms when the sensor is flexed 180 degrees, i.e., with a tip of the sensor bent all the way to its base. In other embodiments, an attribute of flexible sensing device 110 may decrease in value when flexible sensing device 110 is flexed from the quiescent position. In the position shown in FIG. 4, the resistance may be approximately 15 k ohms, as flexible sensing device is bent approximately halfway between the unbent position and the fully bent position, as mentioned above. The resistance of flexible sensing device 110 may change linearly or non-linearly as the sensor is flexed. Such resistance is measured by the internal processing circuitry, either directly or indirectly, and compared to one or more predetermined resistances in order to determine when a door has been opened. Indirect measurement of the attribute may be accomplished, in one embodiment, by using a simple voltage divider, or some other well-known circuit, as described later herein.

Figure 4:
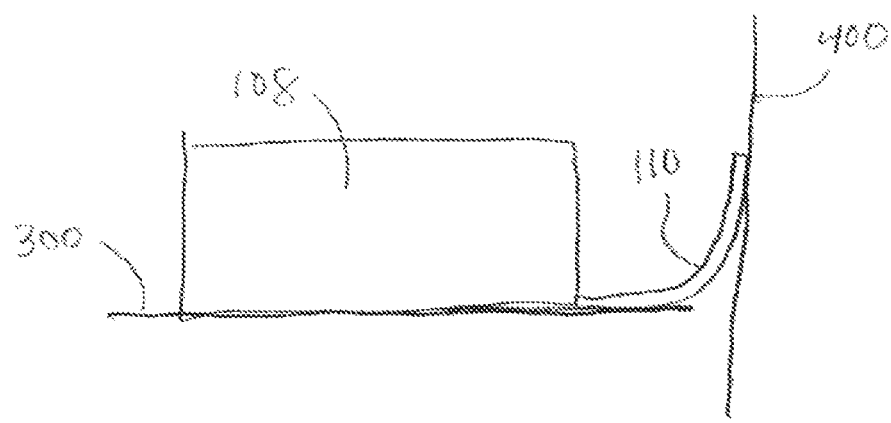
FIG. 4 is a side view of the electronic sensor as shown in FIGS. 2 and 3, mounted to the surface as shown in FIG. 3.

FIG. 4 is a side view of the electronic sensor 104 as shown in FIG. 3, mounted to a surface 300. However, in this view, flexible sensing device 104 is shown as being bent, or deflected, by a second surface 400, such as a door, window, object or animal, when electronic sensor 104 is mounted to a door jamb, a door, or a hard surface. As described above, flexible sensing device 110 may present a greater, or less, resistance to the internal processing circuitry when flexible sensing device 110 is bent to the position as shown.

In one embodiment, the sensor shown in FIGS. 3 and 4 may be used in applications other than security. For example, the sensor may be used to monitor the status of a valuable object, such as a TV, computer, work of art, etc. The sensor may be attached, via pressure-sensitive adhesive, Velcro®, or some other well-known temporary or fixed adhesive means, to a valuable object, or to a static surface such as a floor, wall, desk, or table in proximity to where a valuable object may be located. In either case, flexible sensing device 110 may be bent to the position shown in FIG. 4 as the valuable object is set in place on a floor, wall, desk or table against flexible sensing device 110. Then, if the valuable object is moved, flexible sensing device 110 springs back to its quiescent form, in this example "straight", as shown in FIG. 3, by a restoring force of flexible sensing device 110, as the valuable object is no longer in place to hold flexible sensing device 110 in the flexed position. When flexible sensing device 110 returns to the quiescent position via the restoring force after the valuable object has been removed, internal circuitry detects a change in one or more values of one or more attributes of flexible sensing device 110, such as its resistance, and transmits an alarm signal when one or more of the values meet, exceed, or fall below, one or more predetermined thresholds. In this way, the sensor monitors against potential theft of the valuable object.

In another example, the sensor shown in FIGS. 3 and 4 may be used to monitor for the presence of animals and, in one embodiment in particular, rodents. In this application, the sensor may be affixed to the bottom of a wall where rodents are suspected, as rodents typically travel along walls. When a rodent passes the sensor, the rodent's body deflects or bends flexible sensing device 100, causing one or more attributes to change. This change is detected by the internal processing circuitry, and the sensor may transmit a message indicative of a potential rodent.

Figure 5:
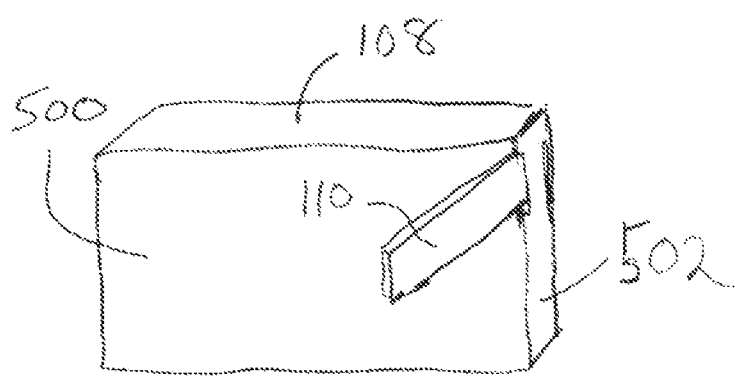
FIG. 5 is a perspective, rear view of another one of the electronic sensors shown in FIG. 1, configured for mounting to a window frame.

FIG. 5 is a perspective, rear view of electronic sensor 106 in another embodiment, configured for mounting to a window frame, such as a single hung window having a fixed first portion and a slidable second portion. In this embodiment, flexible sensing device 110 extends perpendicularly from a rear surface 500 of housing 108, in one embodiment, in a plane parallel to a left surface 502 of housing 108. In this embodiment, the rear surface 500 is affixed to a window frame with flexible sensing device 110 extending into open space that allows the slidable second portion of the window to move. When the window is opened, flexible sensing device 110 is bent by the slidable portion, causing one or more values of one or more attributes of flexible sensing device 110 to change. When a value of an attribute changes more than a predetermined amount, or when the value reaches a predetermined threshold, an alarm signal is transmitted to receiver 126.

Receiver 126 comprises one of a number of electronic devices capable of communications with electronic sensor 104 or 106. Receiver 126 may comprise a central security panel, a gateway, a hub, or a node of a mesh-network. Receiver 126 may be coupled to a wide-area network 128, such as the Internet, in order to relay signals from electronic sensor 104 or 106 to a remote location, such as remote receiver 130. Remote receiver may comprise a central security monitoring center, a mobile phone, a computer, or some other electronic end device.

Figure 6:
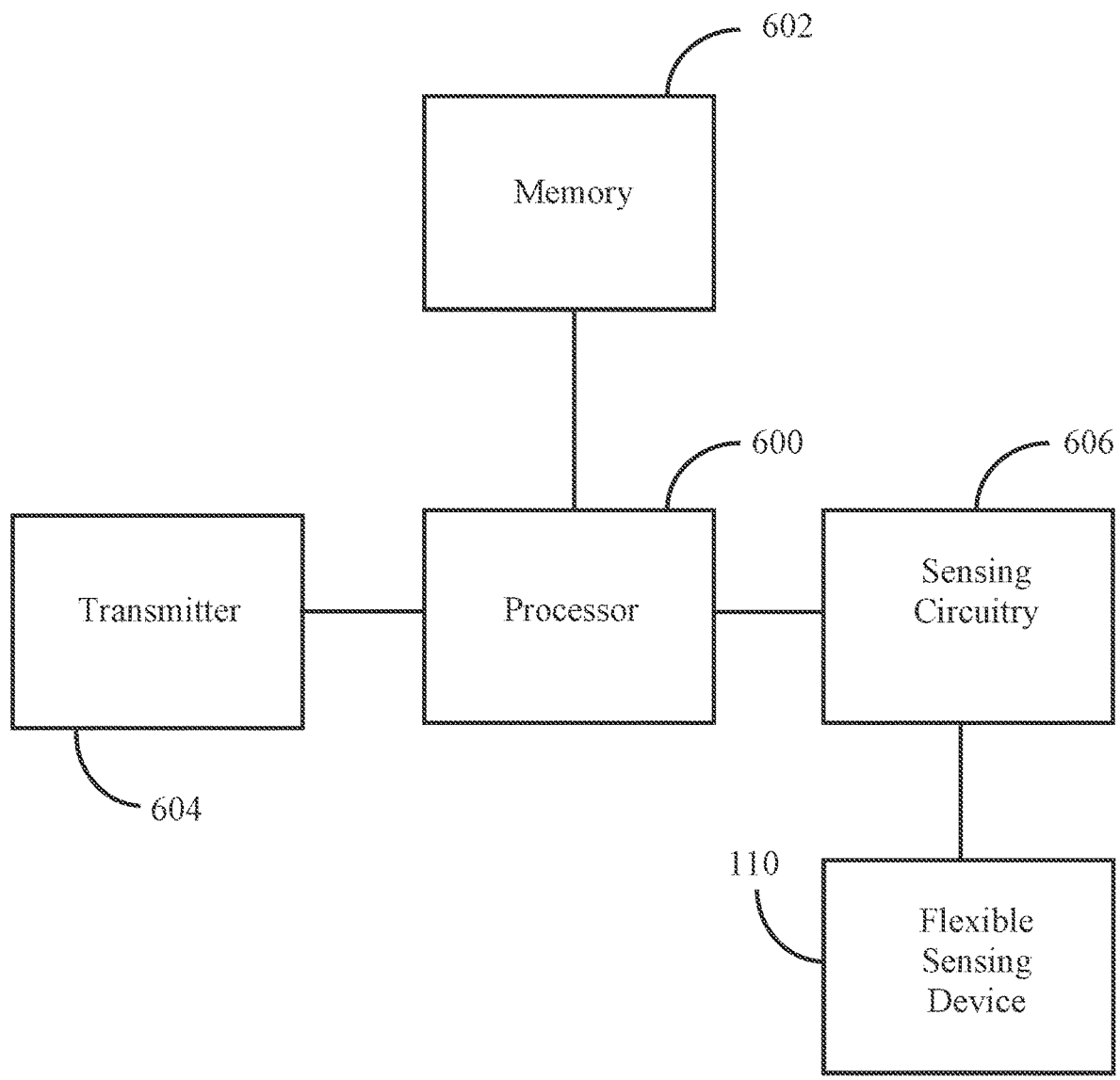
FIG. 6 is a functional block diagram of one embodiment of the electronic sensors shown in FIGS. 1-5 in accordance with the teachings herein.

FIG. 6 is a functional block diagram of one embodiment of electronic sensor 104 or 106 in accordance with the teachings herein. Specifically, FIG. 6 shows processor 600, memory 602, flexible sensing device 110, transmitter 604 and sensing circuitry 606. It should be understood that the functional blocks may be coupled to one another in a variety of ways, and that not all functional blocks necessary for operation of the electronic sensor are shown (such as a power supply), for purposes of clarity.

Processor 600 is configured to provide general operation of the electronic sensor by executing processor-executable instructions stored in memory 602, for example, executable code. Processor 600 typically comprises a general purpose processor, such as an ADuC7024 analog microcontroller manufactured by Analog Devices, Inc. of Norwood Mass., although any one of a variety of microprocessors, microcomputers, and/or microcontrollers may be used alternatively. Due to the relative small size of electronic sensors, and the fact that most electronic sensors are battery-powered, processor 300 is typically selected to have low power consumption, small in size, and inexpensive to purchase.

In one embodiment, processor 600, memory 602 and transmitter 604 are combined into a single module, such as the case with a Z-Wave 700 series ZGM130S SIP Module in an embodiment that utilizes the Z-wave 700 protocol. The ZGM130S SIP Module allows mesh-type, wireless communications between sensor 104/106 and receiver 126, either directly or through one or more other Z-Wave devices. In another embodiments, other system-on-chip modules provide functionality in place of processor 600, memory 602 and transmitter 604, supporting other common mesh-network protocols such as Zigbee®, RF4CE, 6LoWPAN, WirelessHART EnOcean, ISAIOO.lla, IEEE 802.15.4 and/or others.

Memory 602 comprises one or more information storage devices, such as RAM memory, ROM memory, EEPROM memory, UVPROM memory, flash memory, SD memory, XD memory, or other type of electronic, optical, or mechanical memory device. Memory 602 is used to store processor-executable instructions for operation of the electronic sensor as well as any information used by processor 600, such as threshold information and identification information. Memory 602 excludes propagating signals.

Transmitter 604 comprises circuitry necessary to wirelessly transmit alarm signals and/or other information from electronic sensor 104/106 to receiver 126 or a gateway device coupled to a wide area network such as the Internet, either directly or through in intermediate device, such as a repeater, commonly used in popular mesh networks. Such circuitry is well known in the art and may comprise BlueTooth, Wi-Fi, RF, optical, ultrasonic circuitry, among others. In an alternative embodiment, transmitter 604 comprises a transceiver, for wirelessly sending alarm signals and other information, and for receiving information from receiver 126 and/or other devices.

Sensing circuitry 606 comprises hardware and/or firmware to determine one or more values of one or more attributes of flexible sensing device 110. Attributes such as resistance, capacitance and inductance generally cannot be measured directly by processor 600, thus the need, in some embodiments, for such sensing circuitry 606. In one embodiment, sensing circuitry comprises a voltage divider, comprising a first resistor within housing 108, having a first end coupled to processor 600 and a second end coupled to ground and flexible sensing device 110 forming a second "resistor" that has a first terminal coupled to the first end of the first resistor and a second terminal coupled to a power source within housing 108. In this example, as the resistance of flexible sensing device 110 changes, so too does the voltage at the junction of the first resistor, flexible sensing device 110 and the second resistor.

FIG. 7 is a flow diagram illustrating one embodiment of a method performed by electronic sensor 104 or 106 for monitoring a door, window, object or the presence of an animal. While the method is described in terms of electronic sensor 104 monitoring a door, it should be understood that the teachings therein can apply to electronic sensor 106, and in either case, to applications other than security monitoring. It should also be understood that in some embodiments, not all of the steps shown in FIG. 7 are performed, and that the order in which the steps are carried out may be different in other embodiments.

At block 700, processor 600 monitors flexible sensing device 110, either directly or indirectly, to determine if there has been a change of one or more values associated with one or more attributes of flexible sensing device 110. Such attributes comprise a resistance, a capacitance, an inductance, or some other electronic, physical or magnetic attribute of flexible sensing device 110. In this example, flexible sensing device 110 comprises a 2.2 inch flexible sensing device sold by Sparkfun Electronics, comprising a resistance of 10 k ohms when the flexible sensing device is in a static, i.e., non-bent, condition. The resistance of flexible sensing device 110 may be determined empirically by using flexible sensing device 110 as part of a voltage divider circuit. Processor 600 measures a voltage of the voltage divider, which is reflective of the resistance. In one embodiment, processor 600 measures the voltage divider voltage at periodic intervals. For example, processor 600 may remain in a quiescent, low-power state until it is time to measure the voltage once every 100 ms.

In other embodiments, processor 600 determines one or more values of one or more attributes of flexible sensing device 110 using other techniques, with or without the use of sensing circuitry 606. Such techniques are generally known to those skilled in the art.

At block 702, the door being monitored by electronic sensor 104 is opened.

At block 704, as the door begins to open, processor 600 determines that one or more of the values associated with the one or more attributes has begun to change, as flexible sensing device 110 begins bending as the door is opening. In one embodiment, a voltage from a voltage divider begins to decrease as the resistance of flexible sensing device 110 begins to increase.

At block 706, processor 600 determines that the door or window has been opened by comparing the one or more values of the one or more attributes of flexible sensing device 110 to one or more predetermined thresholds. Continuing with the given example, processor 600 may compare the voltage from the voltage divider to a predetermined voltage value stored in memory 602, and when the voltage from the voltage divider meets or exceeds, or drops below, the predetermined voltage, processor 600 determines that the door has been opened.

In one embodiment, the predetermined threshold for determining when the door has been opened can be programmable in order to give a user more control over when to be notified of an opening. For example, a user could use a smart phone or a user-interface of electronic sensor 104 to enter a threshold value in the form of a voltage or, more likely, in the form of a distance that the door may be opened before triggering an alarm. For example, a user may set the threshold value so that "open" means a door or window opening more than 6 inches, one foot, etc., so that users may open doors a small amount for letting air circulate, for example, without triggering transmission of an alarm signal. In this embodiment, processor 600 receives the threshold information from a wireless transceiver coupled to the processor, or via a user interface (i.e., one or more pushbuttons, knobs, or some other mechanical or electronic interface), and stores the threshold in memory 602.

In another embodiment, processor 600 may calculate a velocity and/or acceleration of the door, based on the rate of change of the position, or velocity, of the door as it is being opened. In this embodiment, processor 600 uses two or more values of one or more attributes of flexible sensing device 110 to make the calculation, based on well-known principles. The velocity and/or acceleration may be compared to threshold velocity and/or acceleration values stored in memory 602, and when they are met or exceeded, or fall below, processor 600 may transmit an indication that a violent break-in has occurred. In a related embodiment, processor 600 may transmit an indication that the door is being opened "normally" or "slowly", based on a comparison of the velocity and/or acceleration values to threshold values stored in memory 602. For example, if the velocity of the door is greater than 0.5 ft/sec, but less and 1.0 ft/sec, processor 600 may transmit an alarm signal indicating that the door has been opened, and that the velocity of the opening is "normal". If the velocity of the door is less than 0.5 ft/sec, processor may indicate that the door has been opened "very slowly". If the velocity of the door is calculated to be greater than, say, 2.0 ft/sec, and/or attained an acceleration of 1.5 ft/sec$^2$, processor 600 could indicate that the door was opened "quickly" or "violently".

At block 708, in response to determining that the door has been opened, processor 600 performs one or more actions, such as to transmit an alarm signal to receiver 126 and/or provide an audible and/or visual alert via an indicator and/or speaker. The alarm signal typically comprises an identification of the sensor transmitting the alarm signal, such as a serial number of the sensor stored in memory 602, a door status (i.e., "open", "closed"), a velocity and/or acceleration of the door, and/or an estimate of a position of the door (i.e., half-way open/closed, 3 inches open, wide open, etc.).

At block 710, in one embodiment, processor 600 may, additionally or alternatively to the alarm signal, transmit an indication of one or more measured values of one or more attributes of flexible sensing device 110. For example, processor 600 may transmit the determined voltage of the voltage divider for processing by receiver 126. Receiver 126 may use the voltage from the voltage divider to calculate how for the door or window has been opened, and provide that information to a user, either locally via a local-area network (such as a Wi-Fi network), or via wide-area network 128. The receiver may calculate how far the door or window is open by using a lookup table, stored in a memory of receiver 126. The lookup table could have a column of ascending or descending voltage values, each one with a corresponding estimate of how far the door or window is open, or an angle at which the door is open.

Also in this embodiment, a user can program receiver 126 using a wireless device such as a smart phone, or a user interface of receiver 126, to set various thresholds for electronic device 104, as well as for other electronic devices located throughout a home or business. The thresholds may be in the form of a voltage, current, capacitance, inductance, etc., or in the form of a distance, such as 1 inch, 6 inches, half-way open, etc. In one embodiment, alarm signals from each electronic device can be evaluated by receiver 126 to determine if a user should be notified of each alarm signal. For example, each electronic sensor can be assigned its own threshold(s), stored in a memory of receiver 126, so that when alarm signals are received by receiver 126, receiver 126 can determine whether or not to alert a user. For example, when receiver 126 receives an alarm signal from a first electronic device 104 monitoring a first door, where the alarm signal comprises one or more measured values of one or more attributes of flexible sensing device 110, receiver 126 compares the one or more measured values received from the first electronic device 104 and determines, based on the user-provided threshold(s) stored in its memory in association with the second door/second electronic device 104, to alert a user when a user-provided threshold is set to 1 inch. Alternatively, when receiver 126 receives an alarm signal from a second electronic device 104 monitoring a second door, where the alarm signal comprises one or more measured values of one or more attributes of flexible sensing device 110, receiver 126 compares the one or more measured values received from the second electronic device 104 and determines, based on the user-provided threshold(s) stored in its memory in association with the second door/second electronic device 104, to ignore the alarm signal when a user-provided threshold is set to 6 inches.

At block 712, processor 600 may, additionally or alternatively to the above, transmit an indication of how far the door has been opened, or a position, such as an angle, based on information stored in memory 602. For example, the lookup table as described above could be stored within memory 602. If, for example, the measured voltage from a voltage divider is 1.8 volts, processor 600 may consult the lookup table and locate a voltage in the lookup table closest to 1.8 volts, and read a corresponding estimate of how far the door or window has been opened, for example, 6 inches, one foot, fully open, half-way open, etc.

At block 714, processor 600 may determine that the door or window has been placed into a closed position based on one or more values of the one or more attributes of flexible sensing device 110. For example, when a door or window has been closed, flexible sensing device 110 reverts back to its quiescent state, for example, unbent, and, using the example previously, the voltage from the voltage divider increases as the resistance of flexible sensing device 110 decreases as the door or window moves towards the closed position. Like before, processor 600 may periodically compare the value of one or more attributes of flexible sensing device 110 to one or more predetermined thresholds to determine when the door or window has been closed, and/or to determine the door's velocity and/or acceleration during closing. This threshold may be the same or different than the predetermined threshold to determine when the door has been opened. For example, a user may set electronic sensor 104, or receiver 126, to alarm when the door has been opened more than 6 inches, but to indicate that the door or window has been closed only when the door or window is fully closed.

At block 716, in response to determining that the door or window has been closed, processor 600 causes an indication that the door or window has been closed to be transmitted via transmitter 604 to receiver 126. In one embodiment, processor 600 calculates the velocity and/or acceleration of the door as it was being closed and provides that information to receiver 126.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method, performed with an electronic sensor having a housing and a flexible sensing device protruding from the housing, comprising: securing the housing to a first portion of a barrier with the flexible sensing device extending into a space into which a second portion of the barrier may be moved; monitoring, by the electronic sensor, an attribute of the flexible sensing device of the electronic sensor; generating, by the electronic sensor, an alarm signal when a processor determines that a value of the attribute of the flexible sensing device has changed more than a predetermined threshold; and transmitting, via a transmitter of the electronic sensor, the alarm signal.

2. The method of claim 1, wherein the flexible sensing device comprises a length of flexible material and an electrical connector for coupling the flexible sensing device to the processor.

3. The method of claim 2, wherein the attribute is a resistance of the flexible sensing device.

4. The method of claim 2, wherein the attribute is a capacitance of the flexible sensing device.

5. The method of claim 2, wherein the attribute is an inductance of the flexible sensing device.

6. The method of claim 2, wherein the value of the attribute changes as the flexible sensing device is bent by the second portion of the barrier being monitored by the electronic device as the second portion of the barrier is moved into the space.

7. The method of claim 2, wherein the first portion of the barrier is a door jamb and the second portion of the barrier is a door edge proximate to the door jamb.

8. The method of claim 2, wherein the first portion of the barrier is a window casing and the second portion of the barrier is an upper frame member of a lower sash of a window.

9. The method of claim 1, wherein the predetermined threshold comprises a threshold value that allows the second portion of the barrier being monitored by the electronic sensor to be opened a predetermined amount without generating or transmitting the alarm signal.

10. The method of claim 1, further comprising:
determining, by the electronic sensor, how far the second portion of the barrier being monitored by the electronic sensor is open based on the value of the attribute.

* * * * *